May 2, 1961 D. COOKE 2,982,032
EDUCATIONAL DEVICE FOR TEACHING SYLLABLES OF WORDS
Filed March 9, 1960 2 Sheets-Sheet 1
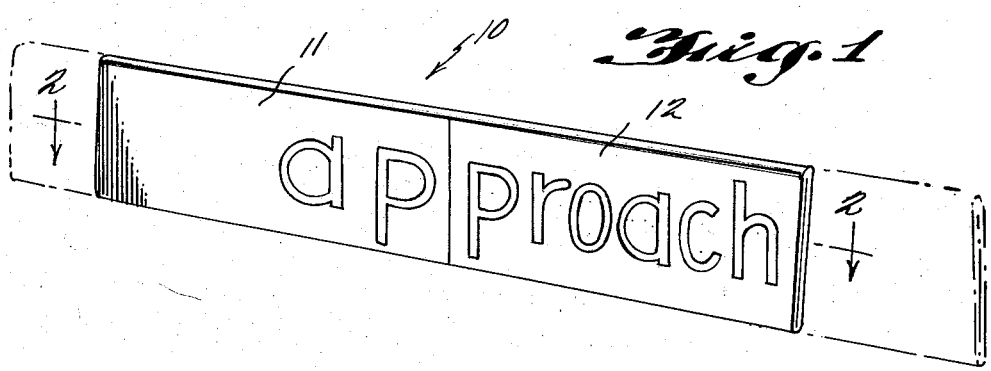
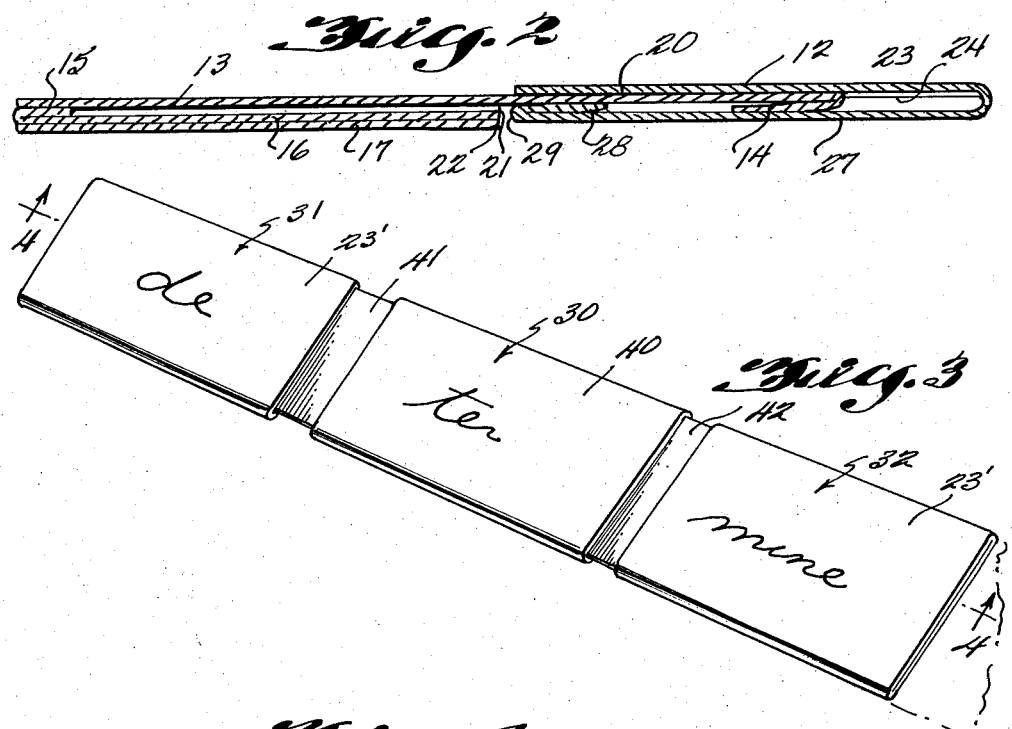
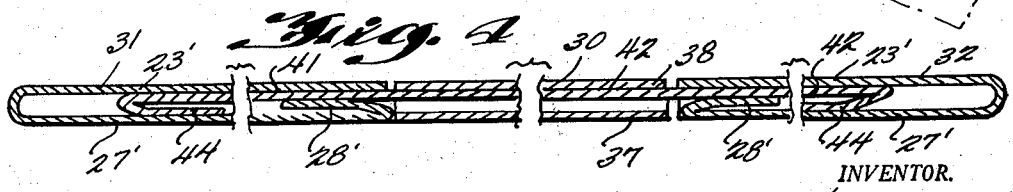
INVENTOR.
DWIGHT COOKE
BY
Kimmel & Crowell
ATTORNEYS May 2, 1961 D. COOKE 2,982,032
EDUCATIONAL DEVICE FOR TEACHING SYLLABLES OF WORDS
Filed March 9, 1960 2 Sheets-Sheet 2

INVENTOR.
DWIGHT COOKE
BY
Kimmel & Crowell
ATTORNEYS

United States Patent Office 2,982,032
Patented May 2, 1961

2,982,032
EDUCATIONAL DEVICE FOR TEACHING SYLLABLES OF WORDS
Dwight Cooke, R.F.D. 1, Uncasville, Conn.
Filed Mar. 9, 1960, Ser. No. 13,955
1 Claim. (Cl. 35—75)

This invention relates to an educational device and has as its primary object the provision of a member comprised of a plurality of slidably separable segments, upon each of which is adapted to be printed or written one syllable of a polysyllabic word, with one syllable of the word printed on each of two or more separable segments, for the purpose of teaching students syllable separation or the like.

An additional object of the invention is the provision of such a device which includes one or more slidably separable segments provided with means for preventing the complete detachment of the segments inadvertently.

Still another object of the invention is the provision of a device of this character in which the segments may be readily detached from each other when desired.

A further object of the invention is the provision of a device of this character which may be readily adapted to various forms of teaching wherein the separation of elements, such as the syllables of a word, or numbers, or the like, is desirable.

A further object of the invention is the provision of a device of this character which is sturdy and durable in construction, reliable and efficient in operation, and relatively simple and inexpensive to manufacture.

Other objects reside in the combinations of elements, arrangements of parts, and features of construction, all as will be more fully pointed out hereinafter, and shown in the accompanying drawings, wherein:

Figure 1 is a perspective view of one form of device constructed in accordance with the instant invention.

Figure 2 is an enlarged sectional view taken substantially along the line 2—2 of Figure 1, as viewed in the direction indicated by the arrows;

Figure 3 is a perspective view of a modified form of construction;

Figure 4 is a sectional view taken substantially along the line 4—4 of Figure 3, as viewed in the direction indicated by the arrows, on an enlarged scale;

Similar reference characters refer to similar parts throughout the several views of the drawings.

Figure 5:
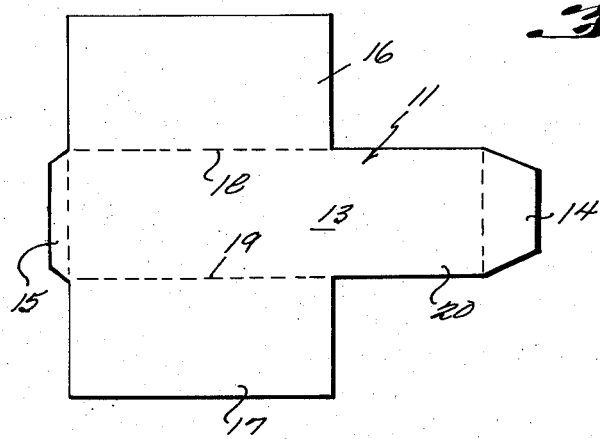
Figure 5 is a plan view of one of the segments employed in constructing the apparatus prior to folding.

Having reference now to the drawings in detail, and more particularly to Figure 1, there is generally indicated at 10 one form of device constructed in accordance with the instant invention, which is comprised of two separable segments, 11 and 12. The segment 11 is comprised, as best shown in Figure 5, of a central body portion 13, provided at one end with a foldable tab 14, and at its other end with a second tab 15. Panels 16 and 17 extend transversely from opposite sides of the body portion 13, and are bendable along fold lines 18 and 19 to overlie the central section 13. When the device is assembled, the portions 16 and 17 are adhesively secured together, and to the end tab 15, leaving a projecting tongue 20, which is adapted to extend into a pocket in an oppositely positioned segment 12. The tongue 14 is folded back, for a purpose to be more fully described hereinafter.

Figure 6:
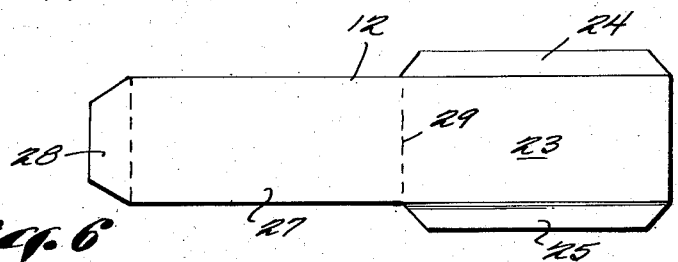
Figure 6 is a view similar to Figure 5 but showing another form of segment.

The segment 12 is formed, as best shown in Figure 6, from a blank having a central portion 23 which is provided with oppositely disposed relatively narrow foldable tabs 24 and 25 extending transversely therefrom. An elongation of central body portion 23, indicated at 27, is of substantially the same length as the portion 23, and a fold line 29 is provided to permit the portion 27 to be folded back over the portion 23. A tab 28 is also provided at the end of portion 27. In the assembly of this device, the portion 27 is folded under the portion 23, as best shown in Figure 2, with the tabs 24 and 25 folded inwardly between the two sections, and adhesively secured to the underside of portion 27, thus forming an open pocket for the reception of the extending portion 20 of section 11. The tab 28 is folded upwardly and inwardly beneath the portion 23 and is unsecured, so that when the device is separated tabs 14 and 28 will engage to preclude complete separation of the parts. Obviously, when total separation is desired, the exertion of a relatively small amount of pressure will permit the disengagement of tabs 14 and 28 so that the parts may be completely disassembled.

A relatively thin instrument such as a letter opener or the like may be employed to depress the tabs 14 to permit the same to pass over tabs 28 without damage or disarrangement of the device.

The engagement of the end 29 of portion 27 with ends 21 and 22 of portions 16 and 17 prevents the telescoping of the two segments beyond a desired predetermined point.

In a device such as shown in Figure 1, the parts may be made of cardboard or the like, and a two syllable word, as illustrated, the word "approach," is depicted on the device, with the first syllable "ap" on section 11, and the second syllable "proach" in the section 12.

In the use and operation of the device, the teacher first shows the composite word to the class, with the parts in the position as shown in Figure 1. Then after appropriate discussion of the separate syllables of the word, by pulling the opposite ends of the device, the two syllable word may be separated by moving the end portions to the positions of the dotted lines of Figure 1, so that the two syllables are separated by a blank space. The interengagement of tongues or tabs 14 and 28 limits the separation to the desired amount.

Figure 7:
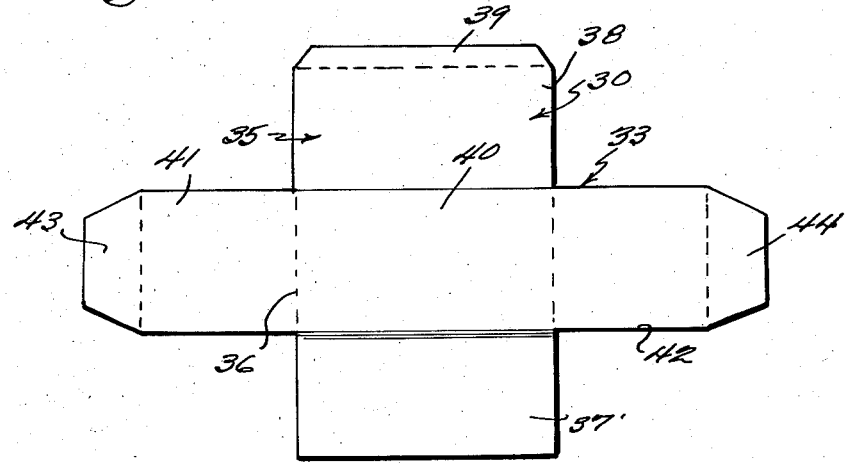
Figure 7 is a similar view of still a third form of segment employed in constructing the device of the instant invention.

Figures 3 and 4 disclose a modified form of construction, particularly adapted for three syllable words. In this form of the invention there is provided a center section 30, and end sections 31 and 32. The sections 31 and 32 are identical in construction to the section 12, and formed from identical blanks, which include upper and lower portions 23' and 27' as well as the end tab 28', all identical to the previously disclosed in section 12. The center section is formed from a blank, generally indicated at 33, in Figure 7. This blank may be comprised of two parts, one, 35, consisting of a center section 36 and two end sections 37 and 38, the latter being provided with a tab 39, and a second section 40, which comprises a straight member having extending portions 41 and 42 which extend beyond the ends of center portion 36. End portions 41 and 42 are provided with foldable tabs 43 and 44, respectively. The portion 35 may be suitably secured in position relative to the portion 40 by adhesive, or other suitable means.

It will be obvious that if desired the blank 33 may be cut from a single piece of material.

The modified form of the invention shown in Figure 3 may be made of any desired material, and, in the form shown, may be considered to be of washable plastic. In this case a three syllable word, such as "determine" may be written in washable ink, with the three syllables on the three respective parts. When the parts are juxtaposed so that their ends are in abutting relation, the three syllables will merge into a single word, but when the end portions 31 and 32 are grasped and pulled outwardly, the three syllables of the word will be clearly set off. Obviously, engagement of the tongues 43 and 44 with the oppositely disposed tongues 28' will prevent complete separation of the segments, as in the foregoing modification.

The device may obviously be made in any desired size and the segments may be of a length to receive a single letter rather than a syllable to allow the separation of a word by individual letters to teach the blending of vowels or vowel diagraphs.

From the foregoing it will now be seen that there is herein provided an educational appliance which accomplishes all of the objects of this invention, and others, including many advantages of great practical utility.

As many embodiments may be made of this inventive concept, and as many modifications may be made in the embodiments hereinbefore shown and set forth, it is to be understood that all matter herein is to be interpreted merely as illustrative, and not in a limiting sense.

I claim:

In an educational appliance, a plurality of segments, at least one of said segments having a pocket therein, and an extension on another of said segments extending into said pocket, whereby the segments may be separated to a predetermined extent, indicia on the face of each segment representing a syllable of a polysyllabic word, and stop means on said extension limiting the separation of said segments, said stop means comprising a folded tab on the end of said extension and a co-acting tab in said pocket.

References Cited in the file of this patent

UNITED STATES PATENTS

| | | |
|---|---|---|
| 1,538,530 | Troidl | May 19, 1925 |
| 1,666,337 | McDade | Apr. 17, 1928 |

FOREIGN PATENTS

| | | |
|---|---|---|
| 1,157,255 | France | Dec. 23, 1957 |
| 432,365 | Italy | Mar. 17, 1948 |